United States Patent Office 3,478,071
Patented Nov. 11, 1969

3,478,071
REACTION PRODUCTS OF ORGANOTIN MERCAPTO ACID DERIVATIVES AND ORGANOTIN OXIDE, HYDROCARBYL STANNOIC ACIDS (ESTERS)
Lewis B. Weisfeld, Highland Park, N.J., assignor to Carlisle Chemical Works, Inc., Reading Ohio
No Drawing. Filed June 3, 1966, Ser. No. 554,965
Int. Cl. C07f 7/22; C08f 45/62
U.S. Cl. 260—429.7      6 Claims

ABSTRACT OF THE DISCLOSURE

A new composition of matter is prepared by reacting an organotin mercapto acid derivative selected from the group consisting of $$R_nSn(SR'COOR'')_{4-n}, [RSn(SR'COOR'')_2]_2X$$

and

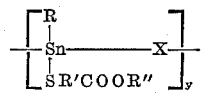

wherein R and R'' are alkyl radicals having up to 12 carbon atoms, R' is an alkylene group of at least 2 methylene groups, X is oxygen or sulfur, $n$ is an integer from 1 to 3 and $y$ designates the degree of polymerization with an organotin oxide, hydrocarbyl stannoic acid or ester and is useful as a heat and light stabilizer for halogen-containing resins.

---

This invention relates to new organotin compounds and to compositions containing the same.

As heat and light stabilizers for various resins, particularly vinyl chloride resins, organotin mercaptoacid esters have been used in recent years to an ever increasing extent. Such esters have the formula (1)      $R_nSn(SR'COOR'')_{4-n}$ wherein R represents a monovalent organic group, generally an alkyl group, preferably an alkyl group having 4–12 C-atoms, such as butyl, octyl, dodecyl and the like. However, it may be also an aryl, alkaryl, aralkyl, alkenyl, oxyalkyl, oxyaryl, cycloalkyl, or any other group which, when the compound is used as stabilizer, does not adversely affect the resin.

R' is an alkylene group, and R'' is the monovalent radical of an alcohol used to esterify the carboxyl group of the mercaptoacid. Generally, it will be an alkyl group having not more than about 20 and preferably 4–12 C-atoms. $n$ is an integer in the range of 1–3. If $n$ is larger than 1, $R_n$ may contain different R groups.

Such organotin mercaptoesters containing the Sn—S linkage, though widely used, have still some drawbacks. One of said drawbacks is the well known objectionable smell presented by the stabilized resin during processing and also in the finished articles. Another disadvantage of the organotin mercaptoacid ester stabilizers is their relatively low tin content. In order to be most effective in rigid plastic formulations, they have to be employed in such large amounts as to lower the heat distortion temperature.

I have now found that at least one of the recited drawbacks and in many cases both can be eliminated by using, instead of the organotin mercapto acid esters, their reaction products with organotin oxides or with stannoic acids, or esters of stannoic acids. Although their precise structures are not always known and their degrees of hydration or polymerization may vary, these reactants may for convenience be represented by the formula (2)      $R^aR^bSnO$ and (3)      $R^aSnOOH$ or (4)      $R^aSnOOR^c$ wherein $R^a$ and $R^b$ have the same significance as R above. As used hereinafter in connection with these compounds the terms "mole" and "molar" shall be interpreted with relation to these formulae.

The reaction is preferably carried out in a suitable diluent such as toluene, benzene, or another inert organic solvent, at temperatures from room temperature to about 155° C. The reaction is mostly terminated in about 30–60 minutes. In order to strip the diluent, and water if formed, reduced pressure will be generally applied. The reaction products of the diorganotin mercaptoesters with diorganotin oxides can advantageously be obtained in a single step by reacting a mercaptoacid ester directly with the required amount of diorganotin oxide, whereby probably the first formed diorganotin dimercaptoester reacts further in situ with the excess organotin compound; however, also in this case, of course, a preformed organotin mercapto acid ester can be reacted with the organotin compound.

Most of the resultant reaction products are clear slightly viscous liquids. When fully reacted, they are completely compatible with e.g. polyvinyl chloride, in contrast, e.g., to the organotin oxides used as reactants. This shows that actual reaction has taken place between the organotin mercapto acid ester and the organotin oxide or sulfide.

In the following description, the term "organotin oxide" is used for the sake of brevity and is intended to refer equally also to stannoic acids and esters. The "organotin oxide" must be employed in such amounts that, after formation of the Sn—S linkage, an excess, preferably at least one mole, is still available. If the organotin mercapto ester contains several carboxylate groups, at least one such excess mole of the "organotin oxide" should be used but not more such excess moles than correspond to the number of available carboxylate groups.

If the excess of "organotin oxide" over the amount required for the Sn—S linkage is less than 1 mole, the reaction product will be a mixture of conventional organotin mercapto esters with compounds of the composition discussed hereinbelow. If the amount of "organotin oxide" is in excess of the available carboxylate groups, said excess will not react and, if used as stabilizer for resins, will form a component which is incompatible wtih the resin and interfere with the stabilizer action.

A diorganotin dimercaptoester can be reacted with one or two moles of "organotin oxide"; a monoorganotin triester reacts with 1, 2, or 3 moles of the "organotin oxide," while a triorganotin mercaptoester reacts with only one mole of the "organotin oxide." The assumption that the reaction takes place in the carboxyl group of the ester is strengthened by the observation that e.g. a dialkyl tin bis (thioglycolic acid ester) does not enter the reaction; it appears that some minimum spacing between the Sn—S and the carboxylate groups is necessary and that the spacing alkylene group of the mercapto acid must have at least a length of two carbon atoms.

Assuming said reaction mechanism, the obtained reaction products would be represented by the formula (5)      $R_nSnZ_{4-n}$ wherein R has the same significance as above, $n$ is an integer from 1 to 3, and Z has the formula (6)     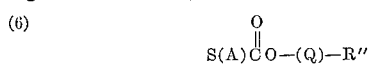

wherein R″ has again the same meaning as above, A is phenylene, or an alkylene chain of at least two methylene groups, which may be interrupted by phenylene; and Q is one of the compounds (2) to (4). If the reaction product contains more than one Z group, such additional Z moieties need not contain the group Q. Also, in one or more of the said methylene groups, one or more hydrogen atoms may be replaced by harmless substituents including an ester group.

If, instead of the compounds of the Formula 1, compounds of the formula (7)     $[RSn(SR'COOR'')_2]_2X$ or (7a)     

X being oxygen or sulfur, and $y$ designating the degree of polymerization, are taken as starting materials, the reaction products will be represented by the formula (5a)     $(RSnZ_2)_2X$ or $(RSn(X)Z)_y$ wherein R, Z, and X have the same meaning as defined above.

Compounds of the Formula 7 are obtained by reaction of two moles of the mercapto acid ester with 1 mole of an organostannoic acid, while those for Formula 7a require only one mole of the mercaptoacid ester. Otherwise, the reaction is carried out in the same way as set forth above.

Though the above given formulae are consistent with all observations made with respect to the organotin mercapto esterorganotin oxide reaction products, it must be understood that the formulae are not to be considered a limitation of the scope of the invention which relates broadly to products obtained by the recited reaction of organotin mercapto esters with "organotin oxides," provided that the mercapto acid of the ester has at least two $CH_2$ or similar groups. Suitable mercapto acid components are e.g. beta mercaptopropionic acid, $\beta$ to $\omega$ mercaptolauric acids, mercapto phenyl acetic acid, mercaptobenzoic acid, and similar acids.

Resins stabilized by the organotin mercapto acid ester-"organotin oxide" reaction products are all those resins for which the organotin mercapto esters have been used. Such resins are particularly vinyl halide polymers and their copolymers with other ethylenically unsaturated compounds such as vinyl acetate, vinylidene chloride, styrene, acrylic compounds and the like. As the new stabilizers contain a much higher tin content per unit of weight, they are particularly useful for the stabilization of rigid compounds. They may be used in amounts of 0.1 to 5.0, preferably 0.1 to 3.0, part of stabilizer per 100 parts of resin.

Instead of mixing the resin with the prepared organotin mercapto acid ester—"organotin oxide" reaction product, the organotin mercapto acid ester and the "organotin oxide," in the proportions defined hereinabove, can be admixed separately to the resin prior to processing because the reaction product will be formed under the processing conditions.

Like the organotin mercaptoacid esters, the new compounds can be used together with a great number of other stabilizers to produce a desired effect.

The following examples are given to show the preparation of the new compounds and their use as stabilizers.

EXAMPLE 1

220 g. (1.0 mole) of isooctylmercaptopropionate and 248.7 g. (1.0 mole) of dibutyltin oxide in 250 ml. of toluene were heated first for 30 minutes at 120° C. and 90 mm. Hg and then for additional 30 minutes at 155° C. and 15 mm. Hg. After cooling and filtering, a clear light liquid was obtained containing 24.98% of tin. This corresponds to a compound of the formula

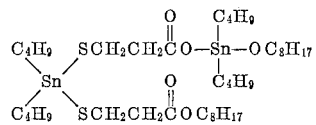

The theoretical Sn content of the compound is 25.9%.

If in the reaction the isooctyl mercapto propionate was replaced by the equimolar amount of isooctylmercaptoacetate, a dark liquid was obtained which was not stable and on standing precipitated much solid material. A successful reaction could not even be obtained when operating under a nitrogen atmosphere. There was always a great amount of unreacted dibutyltin oxide even after prolonged reaction times.

EXAMPLE 2

Example 1 was repeated but with 440 g. (2.0 moles) of isooctylmercaptopropionate and 746.1 g. (3.0 moles) of dibutyltin oxide. The reaction product was a clear light yellow liquid analyzing for 30.89% Sn.

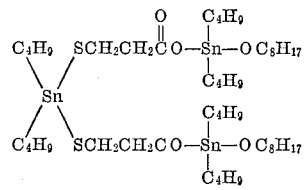

EXAMPLE 3

162 g. (1.0 mole) of butyl mercaptopropionate were heated as described in Example 1 with 248.7 g. (1.0 mole) of dibutyltin oxide in 250 ml. of toluene for 30 minutes first at a temperature of 120° C. at a pressure of 90 mm. Hg and then for 30 minutes at 155° C. at a pressure of 15 mm. Hg.

There were obtained 390 g. of a clear colorless liquid with 28.36% Sn (29.6% Sn theory) of a compound to which I attribute the following configuration:

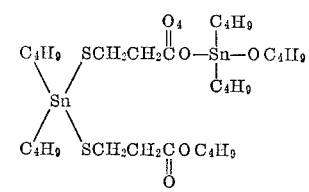

EXAMPLE 4

325 g. (2.0 moles) of butyl mercaptopropionate were treated with 746.1 g. (3.0 moles) of dibutyltin oxide as described in the preceding example. The obtained product was a clear slightly yellow liquid analyzing for 32.35% Sn, satisfying the formula

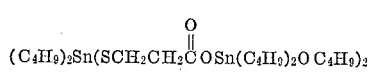

EXAMPLE 5

While the preceding examples illustrate the one-step procedure, this example shows first the preparation of a mercapto ester and in a second step its reaction with an "organotin oxide."

208.7 g. (1.0 mole) of butylstannoic acid and 250 ml. of toluene were charged into a three-neck flask and dehydrated via azeotropic distillation at 120° C. under atmospheric pressure.

654 g. (3.0 moles) of isooctyl betamercaptopropionate were added to the thus obtained product, and the mixture was stripped as set forth in the preceding examples at a temperature of 120° C. and a pressure of 90 mm. Hg. The filtered reaction product of the composition $$C_4H_9Sn(SCH_2CH_2COOC_8H_{17})_3$$

was a clear slightly yellow liquid and had a tin content of 13.38% (theory 14.35%).

To 214 g. (0.258 mole) of this compound, there were added 180.57 g. (0.725 mole) of dibutyltin oxide and 100 ml. of toluene. The reaction mixture was stripped at a pressure of 15 mm. and a temperature of 120° C. The filtered end product was a viscous straw colored clear liquid containing 28.41% Sn.

The compound $$C_4H_9Sn(SCH_2CH_2\overset{O}{\underset{\|}{C}}OSn(C_4H_9)_2OC_8H_{17})_3$$

has a theoretical Sn content of 30.0%.

EXAMPLE 6

Example 5 was repeated with 436.8 g. (2 moles) of isooctyl betamercaptopropionate, instead of the 3 moles of Example 5. In this way, bis(monobutyltin diisooctyl mercaptopropionate) oxide of the formula $$[C_4H_9Sn(SCH_2CH_2\overset{O}{\underset{\|}{C}}OC_8H_{17})_2]_2O$$

was obtained.

To 1240 g. (1.0 mole) of said compound, 994.8 g. (4.0 moles) of dibutyltin oxide and 500 ml. of toluene were added; the mixture was heated up to 120° C. and stripped at a pressure of 15 mm. Hg.

There were obtained 2150 g. of a clear straw colored liquid which analyzed for 30.8% Sn, corresponding to a compound $$\left[\underset{|}{\overset{C_4H_9}{Sn}}(SCH_2CH_2\overset{O}{\underset{\|}{C}}OSn(C_4H_9)_2OC_8H_{17})_2\right]_2O$$

EXAMPLE 7

Example 5 was repeated but instead of 3 moles of the ester, only 218.4 g. (1 mole) of the isooctyl beta mercaptopropionate were used. The product was a very viscous straw colored clear liquid represented by the formula $$[C_4H_9Sn(O)SCH_2CH_2COOC_8H_{17}]_y$$

Sn found: 28.5%; theory 29.01%.

To 409.2 g. of said compound (1 mole), 248.9 g. (1 mole) of dibutyltin oxide were added, and the mixture was reacted in the same manner as in the preceding examples.

EXAMPLE 8

The compounds of Examples 1 and 2 were compared with dibutyltin bis(isooctylacetomercaptide) with respect to heat stabilizing efficacy for vinylchloride resins on a part per part and on a percent tin per percent tin basis. The formulation consisted of 100 phr. of PVC homopolymer and 0.25 phr. of mineral oil. 2.00 phr. of each of the three organotin compounds were milled into this master batch for 3 minutes at 320° F., then strips of stock were oven aged at 350° F., removing samples every ten minutes. In addition, 1.50 phr. of the organotin compound of Example 1 and 1.15 phr. of the organotin compound of Example 2 were milled into virgin stock and these samples were treated analogously. The time to darkening of stock was noted, and also the ability to maintain good early color.

TABLE I

| Stabilizer | Parts per 100 parts of resin | Time to Darkening, minutes |
|---|---|---|
| Dibutyltin bis(isooctylacetomercaptide) | 2.00 | 90 |
| From Example 1 | 2.00 | 110 |
| From Example 2 | 2.00 | >120 |
| From Example 1 | 1.50 | 100 |
| From Example 2 | 1.15 | 100 |

In all cases, also better early color was maintained with the products of Examples 1 and 2.

I claim:

1. As a new composition of matter, the reaction product of an organotin mercapto acid derivative selected from the group consisting of $$R_nSn(SR'COOR'')_{4-n'}[RSn(SR'COOR'')_2]_2X$$

and $$\left[\underset{|}{\overset{R}{Sn}}\underset{|}{\underset{SR'COOR''}{\phantom{X}}}X\right]_y$$

wherein R and R″ are alkyl radicals having up to 12 carbon atoms, R′ is an alkylene group of at least 2 methylene groups, X is a member of the group consisting of oxygen and sulfur, $n$ is an integer from 1 to 3 and $y$ designates the degree of polymerization, with an organotin compound selected from the group consisting of organotin oxides and hydrocarbyl stannoic acids and esters.

2. The reaction product as claimed in claim 1 wherein R and R″ are alkyl having 4–12 carbon atoms.

3. The reaction product as claimed in claim 1 wherein R′ is an alkylene group of at least two methylene groups, which may be interrupted by a phenylene group, or may be a phenylene group, or in which one or more of the methylene groups may be substituted by other harmless functional groups in place of the hydrogens.

4. A process of preparing diorganotin dimercapto ester derivatives having a high tin content comprising reacting one mole of a mercapto acid ester of the formula

HSR'COOR wherein R is a alkyl group and R′ is an alkylene radical of at least two methylene groups, with a dialkyltin oxide, in an amount exceeding half a mole but not exceeding 1½ moles, and said alkyl group have up to 12 carbons.

5. The process as claimed in claim 4 wherein said mercapto acid ester is an alkyl ester of beta mercapto propionic acid.

6. The compound obtained by the process of claim 4.

References Cited

UNITED STATES PATENTS

| | | | |
|---|---|---|---|
| 2,648,650 | 8/1953 | Weinberg et al. | 260—429.7 X |
| 2,832,751 | 4/1958 | Weinberg et al. | 260—429.7 X |
| 2,870,119 | 1/1959 | Leistner et al. | 260—429.7 X |
| 2,870,182 | 1/1959 | Leistner et al. | 260—429.7 X |
| 3,027,393 | 3/1962 | Jenker et al. | 260—429.7 |
| 3,293,273 | 12/1966 | Gloskey | 260—429.7 |

TOBIAS E. LEVOW, Primary Examiner

W. F. W. BELLAMY, Assistant Examiner

U.S. Cl. X.R.

260—45.75